US006598840B1

(12) United States Patent
Siegl

(10) Patent No.: US 6,598,840 B1
(45) Date of Patent: Jul. 29, 2003

(54) PRESENTATION DEVICE

(75) Inventor: Georg Siegl, Vienna (AT)

(73) Assignee: BS-Ausstellungstechnik GmbH, Vienna (AT)

( * ) Notice: Subject to any disclaimer, the term of this patent is extended or adjusted under 35 U.S.C. 154(b) by 0 days.

(21) Appl. No.: 09/700,199

(22) PCT Filed: May 11, 1999

(86) PCT No.: PCT/AT99/00114

§ 371 (c)(1), (2), (4) Date: Nov. 13, 2000

(87) PCT Pub. No.: WO99/59121

PCT Pub. Date: Nov. 18, 1999

(30) Foreign Application Priority Data

May 13, 1998 (AT) ........................................... 313/98 U

(51) Int. Cl.[7] ............................................... F16M 11/38

(52) U.S. Cl. .......................... 248/166; 40/603; 40/610; 248/165; 248/167; 248/188.7

(58) Field of Search ................................ 248/165, 166, 248/188, 188.6, 188.8, 436, 188.7, 173, 186.2, 167, 528; 40/603, 610; 182/155, 134, 92; 403/96

(56) References Cited

U.S. PATENT DOCUMENTS

| | | | | | |
|---|---|---|---|---|---|
| 4,700,498 | A | * | 10/1987 | Perutz et al. | 40/603 |
| 5,095,642 | A | * | 3/1992 | George et al. | 40/610 |
| 5,102,079 | A | * | 4/1992 | Lee | 248/166 |
| 5,362,020 | A | * | 11/1994 | Brown | 248/166 |
| 5,798,861 | A | * | 8/1998 | Doat | 359/461 |
| 5,839,705 | A | * | 11/1998 | LaMotte | 248/165 |
| 5,983,545 | A | * | 11/1999 | Marco | 40/610 |
| 6,161,320 | A | * | 12/2000 | Peterson | 40/605 |
| 6,161,807 | A | * | 12/2000 | Steiner et al. | 248/166 |
| 6,234,434 | B1 | * | 5/2001 | Avinger | 248/188.7 |
| 6,315,253 | B1 | * | 11/2001 | Dicke et al. | 248/188.7 |
| 6,332,284 | B1 | * | 12/2001 | Tafforeau | 40/603 |

FOREIGN PATENT DOCUMENTS

| | | | |
|---|---|---|---|
| DE | 93 01 769 | U | 4/1993 |
| FR | 2 735 264 | A | 12/1996 |
| FR | 2 754 929 | A | 4/1998 |
| WO | WO 96 36958 | A | 11/1996 |

* cited by examiner

*Primary Examiner*—Ramon O. Ramirez
*Assistant Examiner*—Tan Le
(74) *Attorney, Agent, or Firm*—Sughrue Mion, PLLC

(57) ABSTRACT

A presentation device (1) includes a base (5), with bars (3) plugged together for a flexible stand (2), the stand being connected to the base (5) via a plug connection, and with transverse bars (9, 10) as a holding device for a presentation carrier (6) for connecting the latter to the base (5) and the stand (2). For a quick and easy set-up or dismantling, the base (5) is designed with four elongate foldable feet (14 to 17) which are articulated on an elongate crossmember (11) and are capable of being pivoted out of a folded-up position of rest parallel to the crossmember (11) into an operation position at least essentially at right angles to the crossmember (11) and back again.

20 Claims, 10 Drawing Sheets

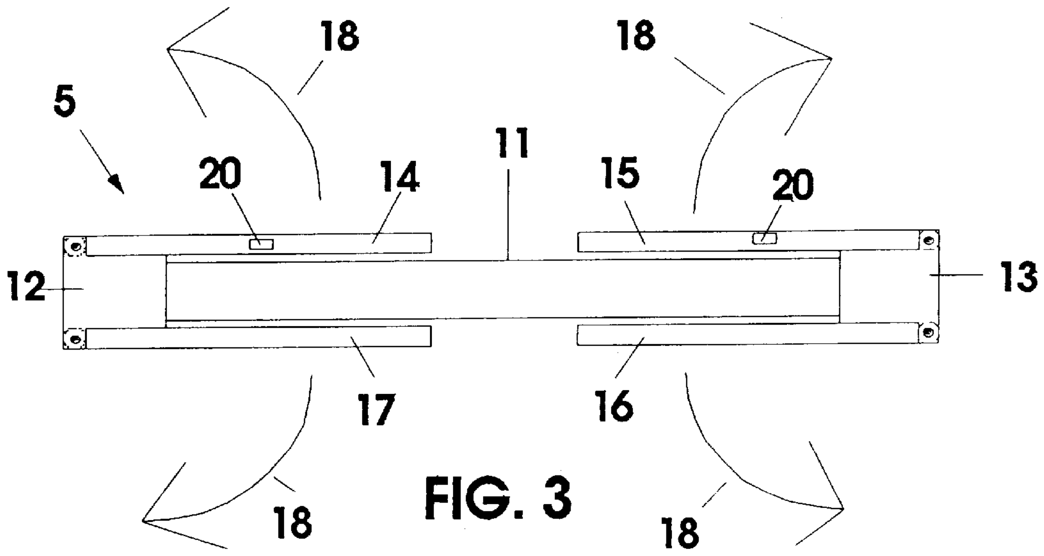
FIG. 3
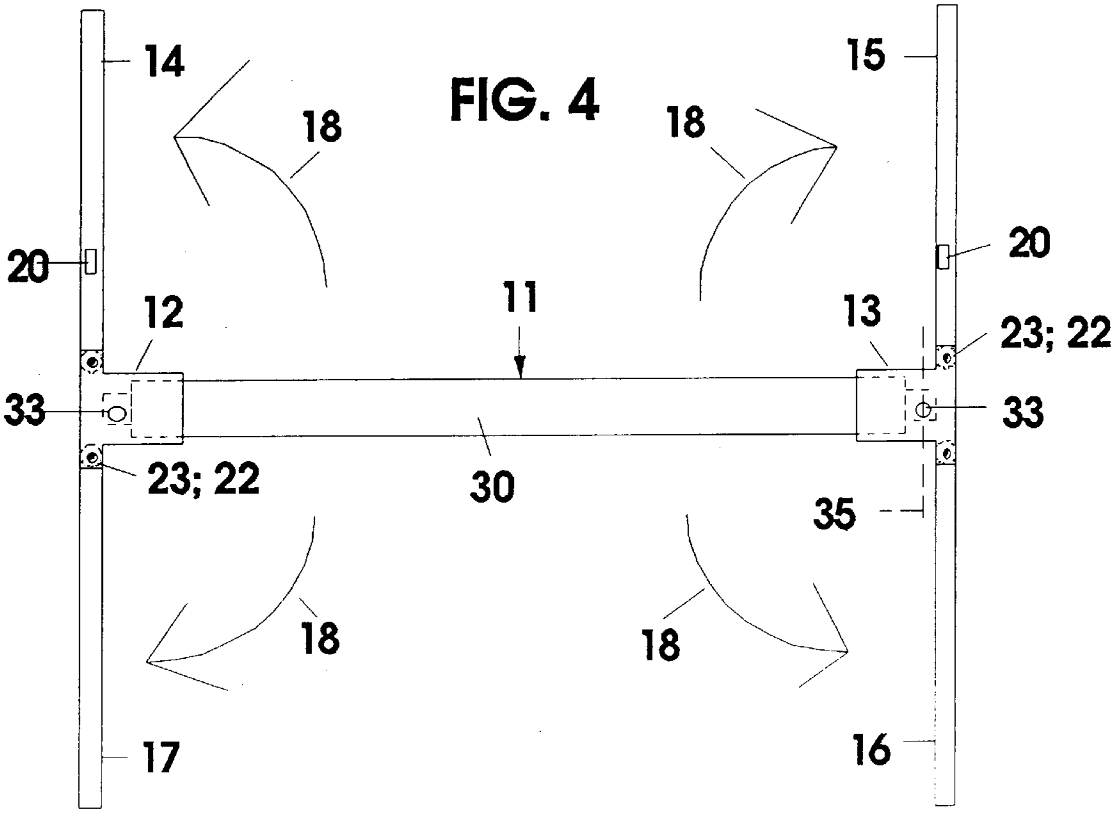
FIG. 4
FIG. 5
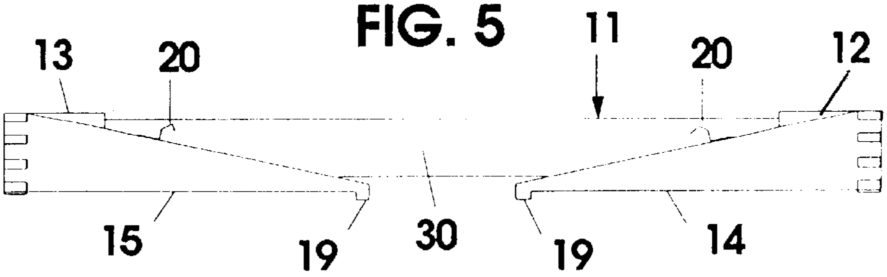

PRESENTATION DEVICE

This is a National Stage entry of application No. PCT/AT99/00114, with an international filing date of May 11, 1999, and the complete disclosure of which is incorporated into this application by reference.

BACKGROUND OF THE INVENTION

The invention relates to a presentation device with a base, with bars, for a flexible stand connectable or connected to the base via a plug connection, and with a holding means for a placard, film or such like presentation carrier for connecting the latter to the base and the stand.

The presentation devices of this type are used for the presentation or display of documents, such as placards, advertising materials, graphics, photographs, etc., a paper, a cloth, a film or such like presentation carrier being held, tensioned, between the base and the upper end of the stand. The flexible stand is, in this case, bent out, utilizing its elasticity, in order to keep the presentation carrier tensioned. The presentation carrier may be provided directly with appropriate imprints, but it may also take the form of a sheet-like or film-like presentation carrier, to which documents, such as photographs, etc., are affixed, as mentioned above.

AT 1 857 U discloses a presentation device of this type which consists of a construction kit of elements to be plugged together, so that, in the dismantled state, this presentation device can be accommodated in a comparatively small compact pack. In particular, here, a base capable of being plugged together from two side parts and a transverse part is provided, and the stand is composed of bars plugged together in a X-shaped manner. It has been shown, on the one hand, that this known presentation device is relatively unstable in the erected state and, on the other hand, that, overall, it is relatively time-consuming and troublesome to plug together the components of the presentation device.

On the other hand, DE 93 01 769 U discloses a presentation device, in which the base consists of two side parts which are connected by means of two transverse rods screwed to them; two relatively long one-piece rods are connected to this base by being inserted into it, in order thereby to form the stand, the presentation carrier being held, tensioned, on ropes between the upper ends of the rods and the base. The rods are connected to one another approximately in the middle of their length by means of a transverse strut which is fixed to the rods with the aid of rings and clamping screws.

SUMMARY OF THE INVENTION

As is clear, this presentation device, too, is relatively complicated to erect and to dismount, above all because a tool also has to be used for this purpose, and moreover, because of the length of the stand rods, at is also not possible to have a compact small pack for transport purposes.

The object of the invention, then, is to provide a presentation device of the type mentioned in the introduction, which can be built up and demounted again by means of unusually few manual actions and without the aid of tools, which, at the same time, can nonetheless be accommodated, in the dismantled state, in a compact small pack, and which, furthermore, has high stability or firmness in the assembled state.

The presentation device according to the invention, of the type mentioned in the introduction, is characterized in that the base is designed with at least two, preferably four elongate foldable feet which are articulated on an elongate crossmember and are pivotable out of a folded-up position of rest parallel to the crossmember into an operating position at least essentially at right angles to the cross-member and back again. In the presentation device according to the invention, therefore, an a ready premounted base is provided, which, in the position of rest of its foldable feet, when these are folded against the crossmember, nonetheless requires only a small amount of space within the pack, but allows high stability or firmness when the foldable feet are folded out, since the articulated connections between the foldable feet and the crossmember can ensure a high stability and firmness of the connection. In this case, the erection of the base can be carried out in the shortest possible time, with the foldable feet being folded out, so that, in this respect too, the above objective is fulfilled in an advantageous way. The bars forming the stand may then be provided in a plug system in a way known per se, and, in particular, even short bar elements, for example with a length of 50 cm or 75 cm, can be plugged together lengthwise, in order to achieve stand heights of, for example, 1.5 m or even over 2 m; the bar length may, of course, also be different—shorter or longer—and, in particular, bar elements with a length of 1 m may also be used.

The bars may in this case have a solid cross section, but tubular bars may also be used, as is preferred per se. In principle, tubular bars arranged telescopically one inside the other may also be employed, but, preferably, identical bars, in particular with equal lengths, which can be plugged together via plug connection elements, are used.

The foldable feet are articulated on the crossmember as far outwards as possible, that is to say at its ends, and, as mentioned, preferably four foldable feet altogether are affixed, in each case two foldable feet being present on a longitudinal side of the crossmember, so that, when he base is in the unfolded state, an I-shape, with the crossmember as the longitudinal leg of the I and with he foldable feet, taken together in pairs, as the transverse webs of the I, is obtained. If desired, the foldable feet may also be pivoted out of the position of rest into the folded-out position through more than 90°, for example through 100° or 110°, a greater spread for higher stability, for example in the case of relatively short crossmembers, thus being obtained by means of the ends of the foldable feet.

The articulated connection between the foldable feet and the crossmember may be stiff per se, so that the foldable feet dwell in a relatively stable manner both in the folded-out position and in the folded-up position, the foldable feet being capable of being pivoted only by the friction in the joints being overcome. Since this may sometimes be troublesome, it has proved particularly beneficial if the foldable feet are lockable at least in the folded-out operating position, preferably also in the folded-up position of rest. In this case, means conventional per se, such as plug-in pins, but also spring catches, etc., may serve for locking the foldable feet. However, a possibility which is simple in terms of both production and operation is afforded if the foldable feet are vertically adjustable relative to the crossmember along joint pins, being freely pivotable in one vertical position relative to the crossmember, for example in a lowered position, and being locked in their respective position in another vertical position, for example a position raised in relation to the crossmember, by coming to bear against a stop of the crossmember. The stop of the crossmember may, in this case, be formed, for example, by a suitably shaped joint strap, against which the respective foldable foot comes to bear with a step or a shoulder. If the foldable feet are vertically adjustable relative to the crossmember, therefore, by means of this vertical adjustment, interlocking in the respective folding position can be achieved by the, for example, plane shoulder coming to bear against the, for example, plane stop face, whereas, in the other relative vertical position, the shoulder and stop lie at different levels, so that the pivoting movement of the foldable feet relative to the crossmember is possible.

In order to ensure a fixed articulated connection in spite of the possibility of the vertical adjustment of the foldable feet, it is advantageous if the joint pins are affixed in joint straps of the crossmember with a press fit. Only the limited vertical adjustment of the foldable feet and their pivoting relative to the joint pins and to the crossmember is thereby possible.

For a stable articulated connection, if appropriate with the possibility of simple vertical adjustment of the foldable feet relative to the crossmember, it is also advantageous, furthermore, if each foldable foot has a plurality of joint straps arranged one above the other and associated joint straps are arranged one above the other on the crossmember, the joint straps of the foldable foot and of the crossmember engaging one into the other.

Moreover, for production reasons, it has proved beneficial if the crossmember is formed by a square profile with pushed-on hollow-profile end parts which carry joint straps. In this case, at least the hollow-profile end parts can be produced as plastic injection mouldings, so that inexpensive manufacture is ensured in spite of the elements necessary for the articulated connection.

It is also advantageous, furthermore, if hooks for suspending a lower transverse bar of the holding means are provided on the top side of two foldable feet provided on one longitudinal side of the crossmember. If, at the same time, the foldable feet are formed with top sides descending towards their outer ends, the hooks, which are at a distance from the joints, may be provided in such a way that they do not project beyond the top side of the crossmember when the foldable feet are in the folded-up state, so that, in this respect too, the compact unit of the base is preserved for packaging purposes.

For a stable hold of the stand on the base, it has proved advantageous, furthermore, if plug-in receptacles for the stand bars are provided in the crossmember, if appropriate the hollow-profile end parts of the latter. For manufacturing reasons, it is also favourable, in this case, if the plug-in receptacles are provided in separate plug inserts. The plug inserts may, in this case, already be premounted in corresponding recesses in the crossmember or in its hollow-profile end parts, for example simply by being plugged into the recesses, and a close fit or a press fit may be provided. At the same time, adaptation to different bar sections, using different plug inserts, may also be carried out, without changes having to be made on the rest of the base itself, so that fewer or smaller different components have to be produced and kept in stock for different sizes of the presentation device.

In order to achieve a stable stand, it is also advantageous if the plug-in receptacles are formed by oblique bores, the axes of which in each case run in a plane perpendicular to the longitudinal axis of the crossmember.

For specific applications, it is advantageous if, in the position of use, the stand is placed onto the base by means of lower bars which extend vertically upwards. This may be envisaged, or example, in the case of comparatively low stands and a slight elastic bending-out or the stand structure when the presentation carrier is affixed. It is therefore beneficial, here, if the plug-in receptacles are formed by bores perpendicular to the longitudinal axis of the crossmember.

The stand bars preferably run essentially parallel to one another in their position plugged into the bores. It may be mentioned that parallel rods are already known from the above-mentioned DE 93 01 769 U, but, there, the stand rods are plugged into tubes on the side parts of the base, specifically in the immediate vicinity of the fastening points of tension ropes for the presentation carrier at the front end of the base. By contrast, in the last-mentioned embodiment of the presentation device according to the invention, the engagement point of the stand is displaced towards the centre of the base, since the crossmember will, as a rule, be in the middle of the base, with the result that an additional increase in the firmness and stability of the stand can be achieved.

In order to ensure a particularly rigid structure of the stand, it is also advantageous if two transverse struts are provided for connecting the stand bars in a double-H shape. In order also to secure the individual components of the stand against displacements in the particularly rigid structure of the latter, it has also proved advantageous if the transverse struts are provided at their ends with T-pieces for plugging in stand bars.

A particularly advantageous design with a double arrangement of presentation carriers back to back may be achieved if combined T-Y-pieces are attached to the upper ends of the stand bars plugged into the plug-in receptacles, and are each provided with two upper blind bores, in order in each case to receive a pair of further stand bars for producing two double-H stand structures. In this embodiment, therefore, the stand structure is divided above the combined T-Y-pieces, so as to obtain two double-H structures which, however, have in common the lower bars plugged into the base and the first lower transverse bar which connects the two combined T-Y-pieces.

Correspondingly, it is advantageous if T-pieces are pushed with their transverse webs onto an upper transverse bar of the holding means, bores for plugging in the stand bars being provided in the legs of said T-pieces.

In the present presentation device, an advantageous development is also obtained in that the projecting uppermost and lowermost transverse bars which are provided for holding the respective presentation carrier and belong to adjacent presentation devices can be connected to one another in a simple way by means of suitable connection pieces. As a result, two or more presentation devices can be erected next to one another and connected to one another, so as to achieve, overall, a composite enlarged presentation surface by means of the individual presentation carriers. This presentation surface can be made uniform by coupling the presentation devices, since coupling takes place virtually in the plane of the individual presentation carriers, so that, overall, the individual presentation carriers are also present in one and the same plane of the presentation surface. Accordingly, an advantageous development of the present presentation device is characterized by connection pieces with axially aligned blind bores for connecting upper and/or lower transverse bars of two double-H structure stands erected next to one another. Moreover, in this case, for ensuring the uniform overall presentation surface which is formed by the presentation carriers, it is beneficial if the presentation carriers on the two double-H structure stands are releasably connected to one another a their mutually adjacent longitudinal edges, for example by means of touch-and-close fastenings.

The invention embraces in the same way both a presentation device in the non-mounted state, as a kit of construction elements, and a presentation device in the mounted state.

BRIEF DESCRIPTION OF THE DRAWINGS

The invention is explained in more detail below by means of preferred exemplary embodiments which are illustrated in the drawing, but to which it is not to be restricted. In particular, in the drawing:

FIG. 3 shows a diagrammatic top view of a base for such a presentation device, with folded-up foldable feet located in the position of rest;

FIG. 4 shows a corresponding top view of this base, but in this case with folded-out foldable feet;

FIG. 5 shows a view of such a base with folded-up foldable feet;

FIG. 13 shows, on a scale enlarged in relation to FIG. 12, an associated T-piece for connecting this transverse strut according to FIG. 12 to bars of the stand by plugging in;

DETAILED DESCRIPTION OF THE INVENTION

Figure 1:
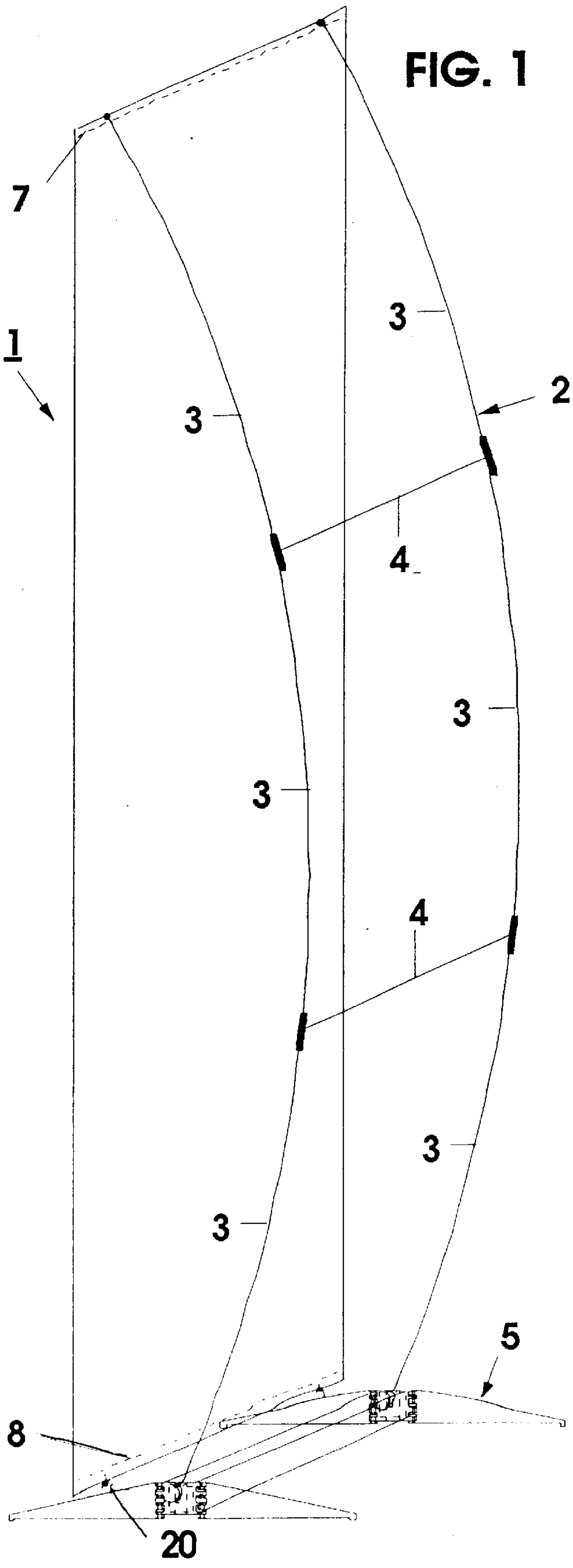
FIG. 1 shows a graphical diagrammatic illustration of a presentation device.
Figure 2:
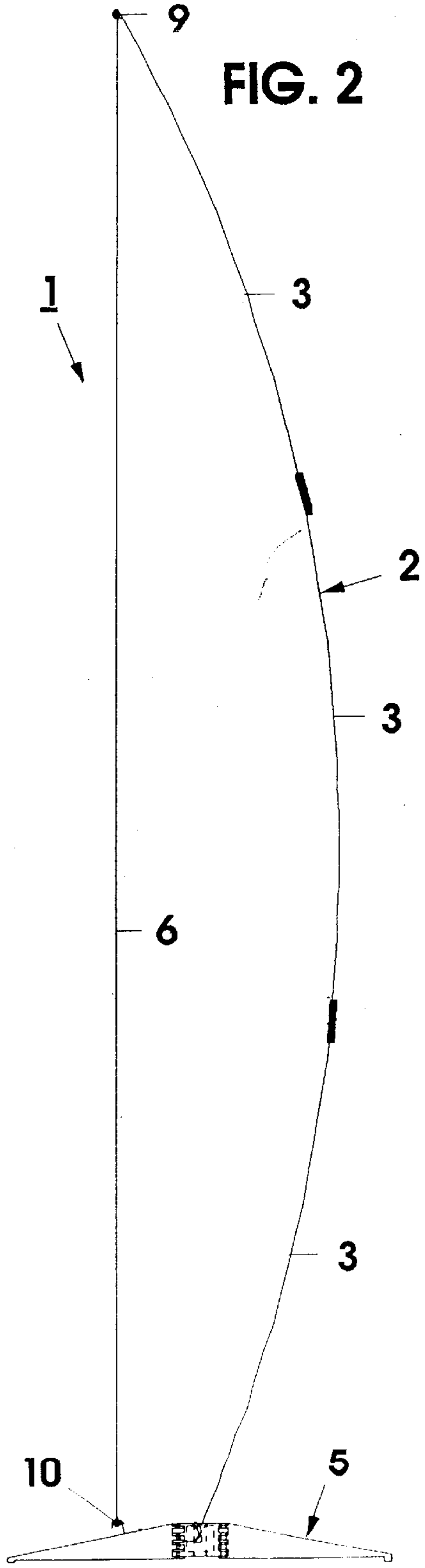
FIG. 2 shows an associated side view of this presentation device.

In the presentation device 1 according to FIGS. 1 and 2, a stand, designated in general by 2, is provided as an elastically flexible actual carrying structure. This stand 2, is composed of individual bars 3 arranged upright, for example 2×3 bars 3, which are identical to one another and are preferably tubular bars, but, if appropriate, also bars with a solid cross section. These bars 3, which consist, for example, of carbon-fibre-reinforced plastic or else of aluminium, are in the detensioned state, cf. also FIG. 14, and they are connected to one another in the mounted stand carrying structure by means of two transverse struts 4, so that a kind of double-H structure is obtained, as is apparent from FIG. 15 as well as from FIG. 1. The bars 3 and transverse struts 4 are to be connected or are connected releasably to one another via plug connections, as will be explained in more detail below with reference to FIGS. 12 to 15.

In the assembled state, the stand 2 is supported on the ground via a base 5, the two lower individual bars 3 of the double-H stand 2 simply having to be plugged into corresponding receptacles of the base 5, as explained in more detail below with reference to FIGS. 6, 9 and 15.

Finally, a flexible element, for example a placard, a film, a cloth or the like, designated in general as a presentation carrier 6, is also provided, its upper and lower edge being wrapped around at 7 and 8 (see also FIG. 14), so that transverse bars 9 and 10 can be pushed in there as a holding or connecting means for fixing the presentation carrier 6 to the upper end of the stand 2 and to the base 5 respectively. When the presentation carrier 6 is affixed in this way, the stand 2 is bent out elastically, as is evident from FIGS. 1 and 2, whereupon the presentation carrier 6 is held, tensioned, in this operating position.

As is apparent particularly from FIGS. 3 to 5 as well as from FIG. 1, the base 5 consists of a crossmember 11, to the end parts 12 and 13 of which foldable feet 14 to 17 are affixed pivotably about vertical axes, in each case on opposite longitudinal sides, cf. also the arrows 18 in FIGS. 3 and 4. The foldable feet 14 to 17 have a generally triangular shape in elevation, as is apparent from FIGS. 5 to 7, but, in a top view, are elongate, and, at their outer free ends, they are provided with foot projections 19 to be placed onto the ground. Two foldable feet affixed to one longitudinal side of the crossmember 11, specifically the foldable feet 14, 15 evident at the top in FIGS. 3 and 4 (cf. also the view in FIG. 5), are provided on their oblique top side with hooks 20 which do not project beyond the top side of the crossmember

Figure 14:
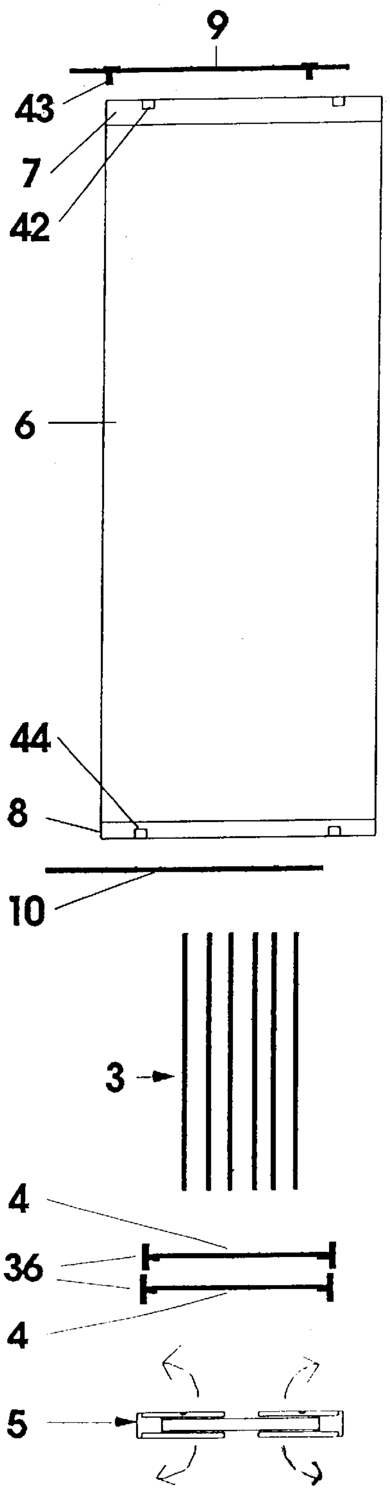
FIG. 14 shows a diagrammatic illustration of the components of the presentation device as a kit of elements.

11 when the foldable feet 14, 15 are in folded-up state, see FIG. 5, so that, when the base 5 is in the folded-together state according to FIG. 3, a compact small unit is achieved both laterally and upwards and downwards and can be accommodated, together with the other elements of the construction kit of the presentation device, see FIG. 14, in a small pack; it must also be pointed out, here, that the presentation carrier 6 is, of course, rolled together in the way customary per se for packaging.

However, when the foldable feet 14 to 17 are in the folded-out state, see FIG. 4, a large standing surface, with the outer free ends and the projections 19 present there, is defined, so as to ensure that the presentation device 1 has high stability in the erected state according to FIG. 1.

Figure 7:
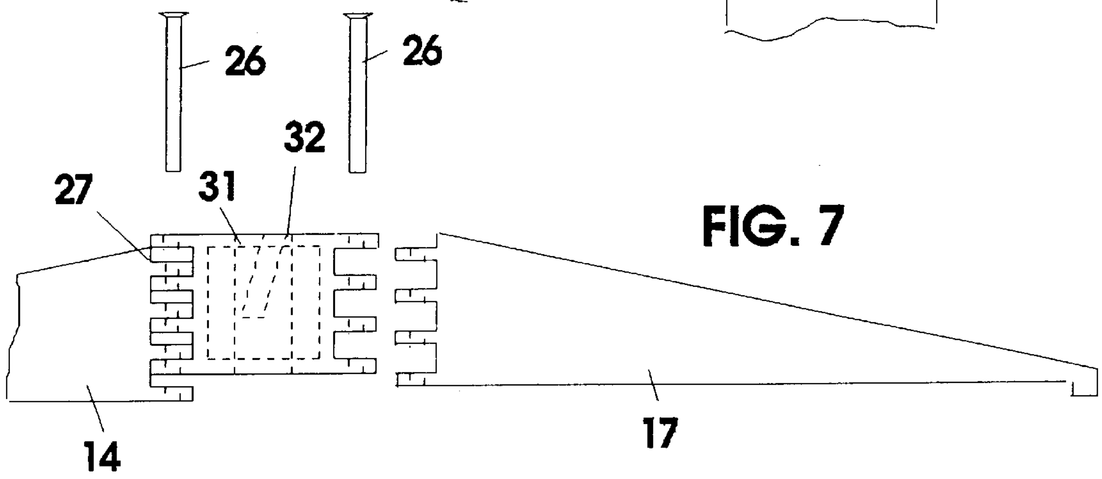
FIG. 7 shows an exploded diagrammatic view of the end face of the crossmember and two foldable feet (one of these only partially) together with associated joint pins.
Figure 6:
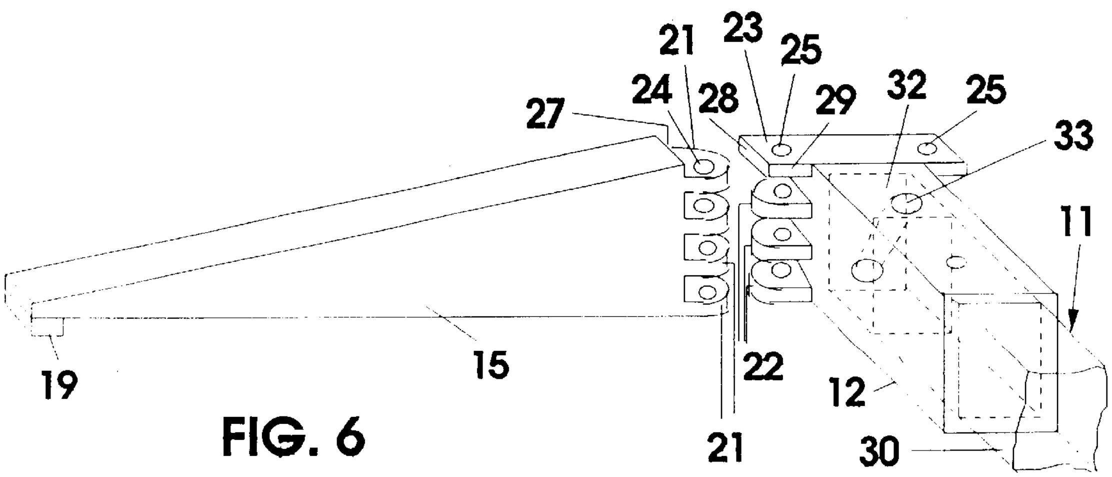
FIG. 6 shows an exploded illustration of part of a crossmember of such a base and a foldable foot for articulation on the crossmember.

As can be seen from FIG. 5 and also from FIGS. 6 and 7, the joints, via which the foldable feet 14 to 17 are articulated on the crossmember 11, are defined by joint straps 21 (on the foldable feet) and 22, 23 (on the end parts 12, 13 of the crossmember 11) which engage one into the other. In the mounted state, these joint straps 21 to 23 engage one into the other, joint pins 26 being plugged in through bores 24 and 25 which are provided in them and which are then aligned with one another. These joint pins 26 are seated in the bores 25 of the joint straps 22, 23 of the crossmember 11 with a press fit, but they are received in the bores 24 of the joint straps 21 of the foldable feet 14 to 17 with slight play, so that these foldable feet 14 to 17 can be pivoted about them and can also be adjusted vertically along these joints pins 26. For this purpose, the distance between the joint straps 22, 23 of the crossmember 11, that is to say the clear width, is approximately twice as great as the thickness of the joint straps 21 of the foldable feet 14 to 17, as may be gathered, in particular, from the illustration in FIGS. 6 and 7.

Figure 8A:
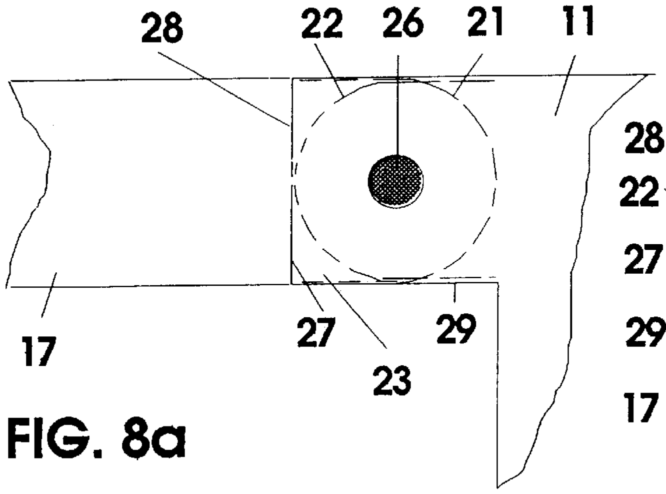
FIGS. 8*a* and 8*b* show two partial top views of the region of articulation of a foldable foot on the crossmember, with the foldable foot folded out (FIG. 8*a*) and folded up (FIG. 8*b*)

The vertical adjustment of the foldable feet 14 to 17 is provided so that, in one vertical position of the foldable feet 14 to 17 relative to the crossmember 11, specifically in the lower position (see the foldable foot 14, illustrated only partially in FIG. 7 on the left-hand side), the respective foldable foot, for example 14, can be moved through, with an upper shoulder 27 adjoining the uppermost joint strap 21, underneath the uppermost joint strap 23 of the crossmember 11, said joint strap being rectangular in a top view. The remaining joint straps 21 and 22 are essentially semicircular in a top view. By contrast, when the respective foldable foot 14 to 17 is in the folded-out or folded-up position, specifically when this foldable foot is in its position raised in relation to the crossmember 11, the uppermost rectangular joint strap 23 of the crossmember forms with its vertical side faces 28 and 29 a stop. As mentioned, so that the foldable foot 14 to 17 can be pivoted, the latter must be displaced downwards along the respective joint pin 26, so that the shoulder 22 can be moved passed underneath the stops 28, 29, and in the respective end position according to FIG. 8*a* or 8*b*, the foldable foot, for example 17, can be pushed up again, so that it is locked, that is to say interlocked, by its shoulder 27 bearing against the stop race 28 or 29. This ensures that, in these two positions of the foldable feet 14 to 17, these are held firmly in relation to the crossmember 11.

Figure 8B:
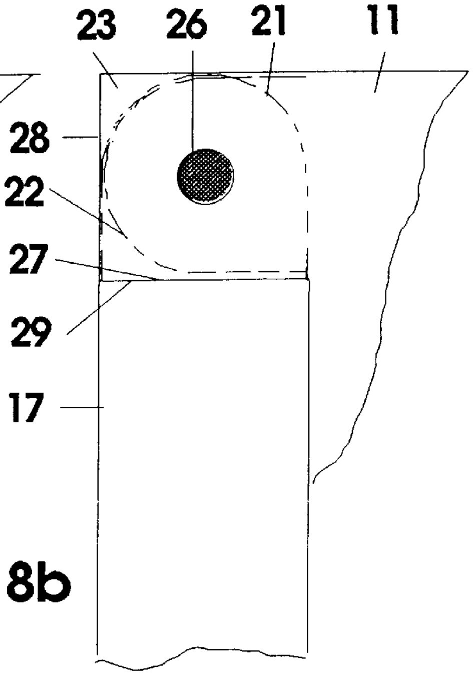

Moreover, in the folded-up position of the foldable feet 14 to 17, the foldable feet are, with their then outer longitudinal sides, see FIGS. 3 and 8*b*, adjacent to and essentially flush with the joint straps 23 on the outside, in order, thereby also to avoid projecting parts in the folded-together position so as to obtain a compact unit.

As may be gathered, in particular, from FIGS. 4 and 6, the crossmember 11 consists of a square profile 30, on the end faces of which the end parts 12, 13 designed in the form of hollow-profile parts are pushed and are fixed with a press fit. It would, however, also be possible, of course, to manufacture the crossmember 11 in one piece with the end parts 12, 13.

Figure 9:
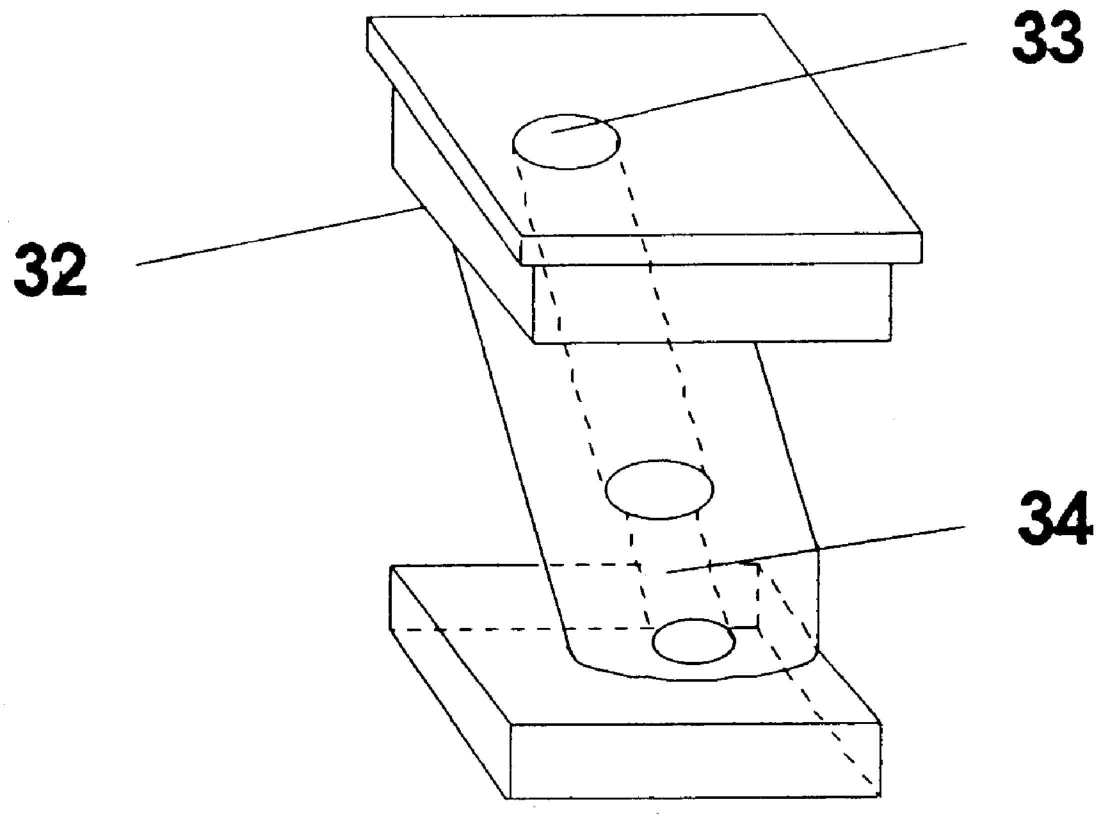
FIG. 9 shows a plug insert with a plug-in receptacle for a bar of the stand of the presentation device.

As mentioned, the end parts 12, 13 not only carry the joint straps 22, 23, which in each case project on their end faces towards both sides, they are also provided with recesses 31, into which plug inserts 32 are inserted, cf., in addition to FIGS. 6 and 7, in particular also FIG. 9, in which a plug insert 32 of this type is shown graphically. Each of these plug inserts 32 injection-moulded from plastic is designed with an oblique bore 33 for plugging in the lower bars 3 of the stand 2 (FIG. 1). For production reasons, in order to avoid stresses during the cooling of the plastic of the plug insert 32, a corresponding recess 34 may also be co-formed on the underside, in order thereby to achieve comparable material thicknesses everywhere. For this reason, the plug insert 32, instead of being entirely in the form of a block, is also designed with upper and lower locating plates which can be seen from FIG. 9.

In the mounted state, the oblique bores 33 in each case run with their axes in a plane perpendicular to the longitudinal axis of the crossmember 11, as indicated diagrammatically at 35, for example, on the right-hand side of FIG. 4. As a result, when the presentation device 1 is mounted, the axes of the lower bars of the stand 2 also run in these perpendicular planes 35, and the bars 3 on the two longitudinal sides of the stand 2 are therefore parallel to one another (in the not yet bent-out state); the same also applies similarly to the bars 3 which are subsequently attached and which are likewise parallel to one another. As already mentioned, transverse struts 4 are provided, which in each case are inserted between the lower ends of upper bars 3 and the upper ends of lower bars 3. With a view to easy mounting and demounting, a plug connection is provided for this connection, T-pieces 36 being used, which are designed identically to one another and which may expediently already be premounted on the transverse struts 4, as is evident from FIG. 12. According to FIG. 13, each of these T-pieces 36 is designed with three blind bores 37, 38 and 39, the transverse strut 4 being pushed into the blind bore 37 and the longitudinal bars 3 to be connected being pushed into the blind bores 38 and 39.

Figure 10:
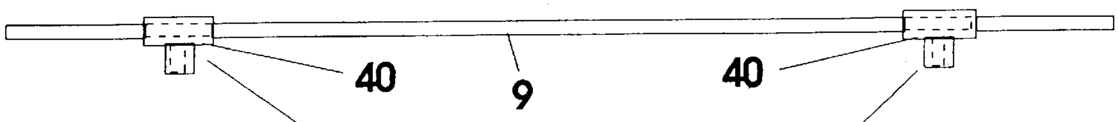
FIG. 10 shows a view of an upper transverse bar of a holding means for the respective presentation carrier.
Figure 11:
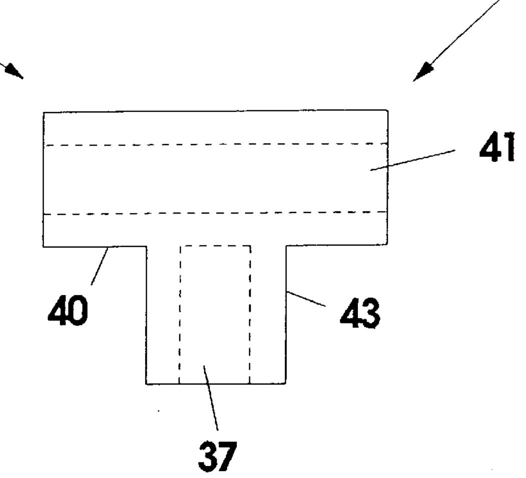
FIG. 11 shows, on a scale enlarged in relation to the preceding Figure, as a detail, a T-piece for connecting the transverse bar to bars of the stand.
Figure 12:
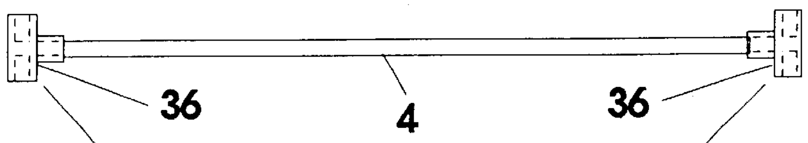
FIG. 12 shows a transverse strut of the stand.
Figure 13:
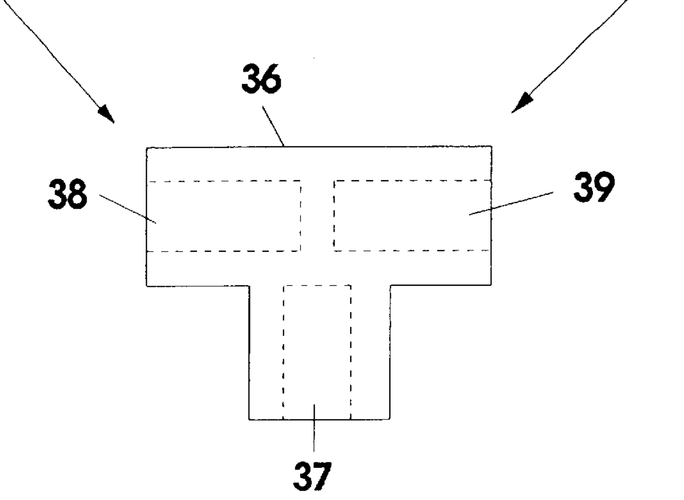

Similar T-pieces 40, but with a continuous bore 41 instead of the blind bores 38, 39, are used for connecting the upper transverse bar 9, which is pushed into the upper wrap-around tab 7 of the presentation carrier 6, to the upper bars 3 of the stand 2. In this case, the transverse bar 9 is pushed through the continuous bore 41, as is evident from FIG. 10, and the upper longitudinal bars 3 of the stand 2 are inserted with their upper ends into the blind bores 37 of these T-pieces 40. In order to make it possible to plug-in in this way, orifices 42 are provided, see FIG. 14, in the wrap-around tab 7 of the presentation carrier 6 in the corresponding positions, the T-pieces 40 projecting with their legs 43 through said orifices.

Correspondingly, orifices 44 are made in the lower wrap-around tabs 8, through which orifices the hooks 20 on the foldable feet 14, 15 can engage (and at the same time engage around the lower transverse bar 10), in order thereby to hold the presentation carrier 6 firmly at the lower end.

Figure 15:
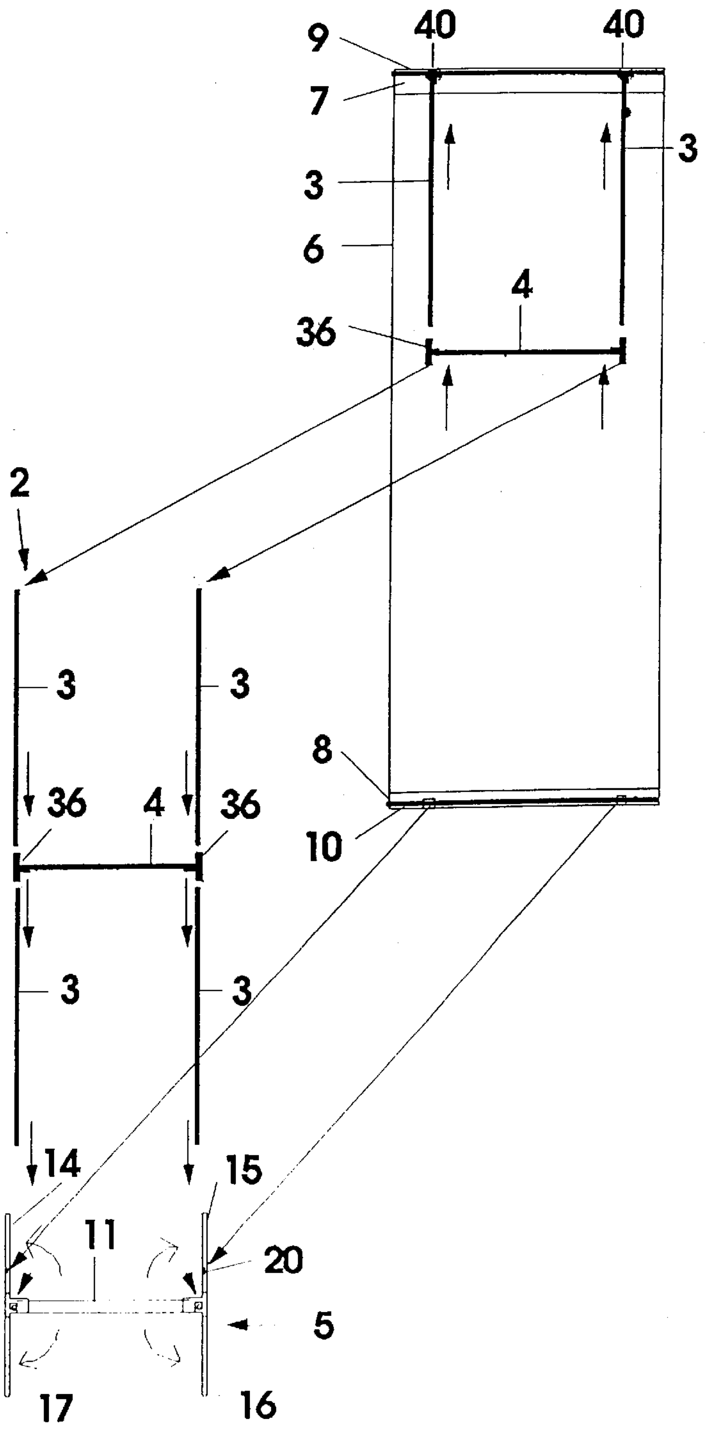
FIG. 15 shows diagrammatically the procedure for assembling the presentation device from the construction kit according to FIG. 14.

It is apparent from FIG. 15 that, when the present presentation device, which is delivered as the construction kit of elements according to FIG. 14, is erected, first the base 5 is erected, with the foldable feet 14 to 17 at the same time being folded out, see also the arrows 18 in FIG. 15. Subsequently, the lower longitudinal bars 3 of the stand 2 are plugged into the plug-in receptacles of the base 5 which are formed by the bores 33, after which the lower transverse strut 4, with the T-pieces 36 on it, is attached to these lower longitudinal bars 3; the middle longitudinal bars 3 are then plugged into the T-pieces 36 on this lower transverse strut 4.

The upper bars 3 of the stand 2 are plugged into the T-pieces 40 previously pushed on the upper transverse bar 9, the transverse bar 9 previously already having been pushed in the wrap-around tabs 7 of the presentation carrier 6. After the bars 3 have been plugged into the T-pieces 40 the upper transverse strut 4 is affixed to these upper bars 3 with the aid of the upper T-pieces 36.

The unit thus obtained, having the presentation carrier 6, the upper bars 3 and the upper transverse strut 4, is then attached as a whole onto the upper ends of the middle longitudinal bars 3 of the stand 2, this being extremely simple and presenting no problems because of stabilization by the two transverse struts 4.

Finally, the presentation carrier 6 is suspended on the hooks 20 of the foldable feet 14, 15 of the base 5 by means of the transverse bar 10 already previously pushed into the lower wrap-around tab 8, the bars 3 being bent out elastically in the way evident in FIGS. 1 and 2. The presentation device 1 is thus ready-mounted.

When the presentation device 1 is demounted, the corresponding procedure is carried out in reverse order, and, in exactly the same way as mounting, this can be carried out quickly and simply with only a few manual actions.

The individual elements 3, 4, 5, 9, 10 and, in the rolled-together state, also the presentation carrier 6 have length dimensions corresponding approximately to one another, so that all these elements can be packaged in a compact small unit.

It is, of course, also possible to provide other plug connection elements instead of separate, already pre-mounted T-pieces 36 and 40 for the above-described plug connections of individual bars and transverse struts; in particular, it would be conceivable to form comparable plug bushes in one piece with the corresponding elements, for example the transverse struts 4 or the upper transverse bar 9. It would also be conceivable, in a similar way, to produce the crossmember 11 in one piece with the end parts 12, 13, and, in particular, the plug-in receptacles or bores 33 may also be provided directly in the end parts 12 and 13, instead of in the separate plug inserts 32, as described. As is also clear, in the unfolded state, the base 5 is supported on the ground only with the outer foot projections 19, and, when the presentation device 1 is in the erected state, the crossmember 11 runs at a distance above the ground. A comparable foot projection (not illustrated) may, however, also be affixed to the underside of the crossmember 11, for example in the middle of the longitudinal extent of the latter, in order thereby to obtain an additional supporting element.

Instead of the above-described vertical adjustment of the foldable feet 14 to 17 for locking in the respective folding positions or for release for pivoting, other locking means known per se would also be conceivable, and, in particular, it would be possible to make the articulated connection stiff in such a way that the foldable feet 14 to 17 remain relatively reliably in the respective pivoting position solely due to friction. On the other hand, push-in locking pins or the like could be provided as alternative locking means, as is known per se and need not be explained in any more detail here.

FIGS. 16 to 23, also explained below, show various other modifications which are particularly advantageous for specific applications, particularly with a view to increasing the presentation surface.

Figure 16:
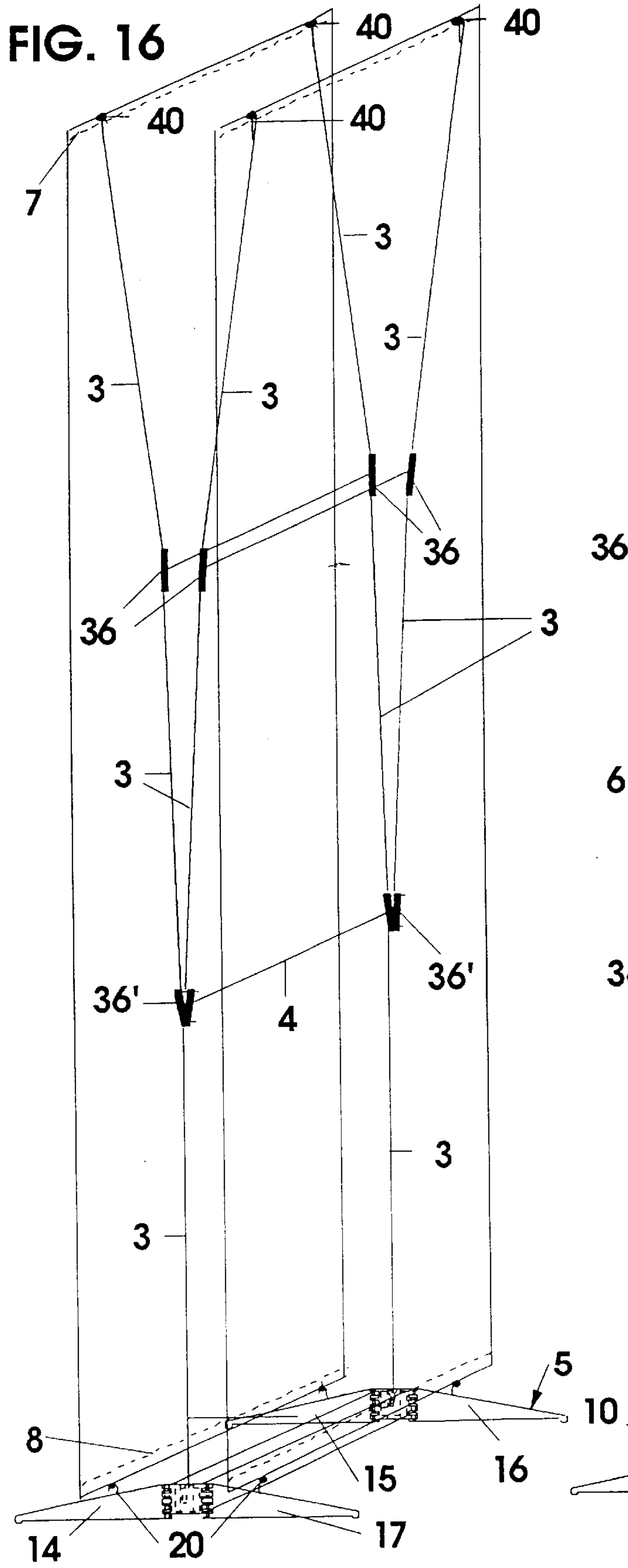
FIG. 16 shows a graphical view, similar to that of FIG. 1, of an embodiment of the present presentation device with a double arrangement of presentation carriers.
Figure 17:
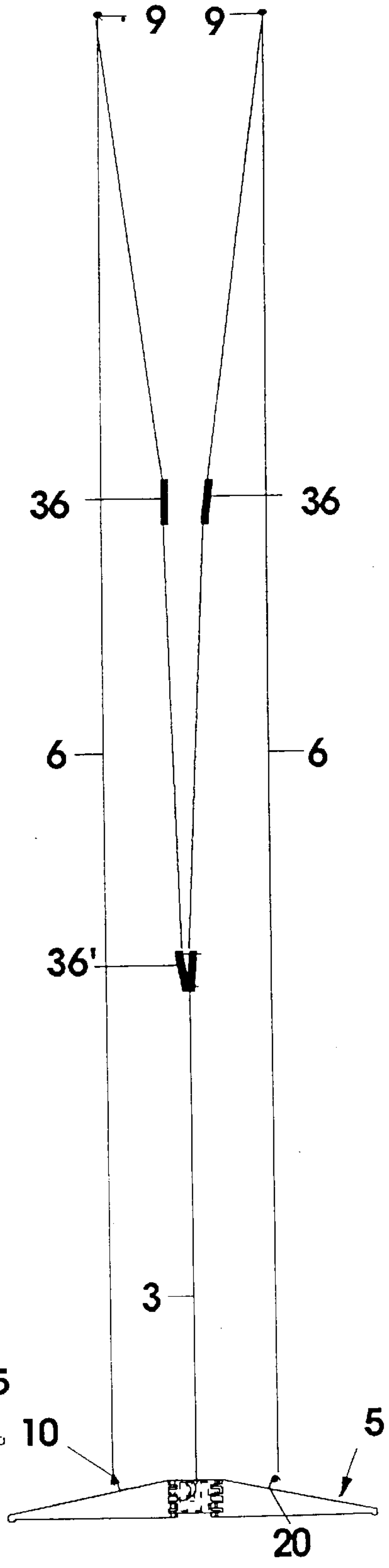
FIG. 17 shows a side view of this presentation device according to FIG. 16.

Thus, FIGS. 16 and 17 show a presentation device with a twofold double-H stand structure 2, in which, in the position of use shown, when two presentation carriers 6 are affixed back to back, the lower bars 3 plugged into the base 5 are oriented vertically. Combined T-Y-(or V) pieces 36' are attached to the upper ends of these lower bars 3, so that, on the one hand, as already described above, the lower transverse bar 4 can be received and, on the other hand, in each case two middle longitudinal bars 3 can be plugged in. Possible forms of these combined T-Y-coupling pieces 36' can be seen in more detail from FIG. 19 and FIG. 20 explained in more detail below.

T-pieces 36 are then in each case attached to the middle bars 3 in the way already described above, in order to receive the upper transverse bars 4 and the uppermost longitudinal bars 3. These uppermost bars 3, in turn, in each case carry in pairs, via the upper T-pieces 40, he uppermost transverse bars 9 (see FIG. 17), to which the two presentation carriers 6 are affixed with the aid of the wrapped-around edge 7.

As described above with reference to FIGS. 1 to 15, transverse bars 10 are plugged in the wrapped-around lower edge region at the lower end of the presentation carrier 6 in a corresponding way, hooking or hooks 20 on the base 5 taking place, as described. In contrast to the embodiment according to FIGS. 1 to 15, in the embodiment according to FIGS. 16 and 17 hooks 20 for suspending the lower transverse bars 10 are provided on all the foldable feet 14, 15, 16, 17.

Figure 18:
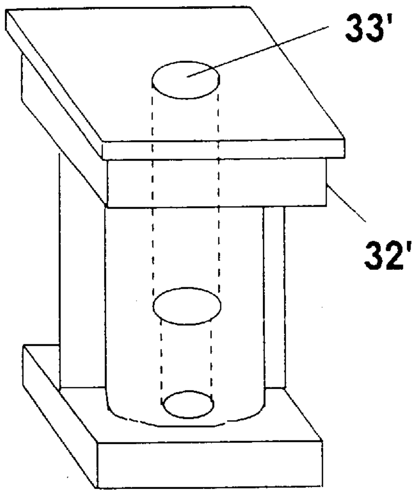
FIG. 18 shows a plug insert modified in relation to the embodiment according to FIG. 9 and having a plug-in receptacle for the presentation device according to FIGS. 16 and 17.

In order to achieve the vertical alignment of the lowest longitudinal bars 3 of the twofold double-H stand structure according to FIGS. 16 and 17, the plug inserts 32' inserted in the crossmember 11 of the base 5, specifically into the recesses 31 located there (cf. FIG. 7), are provided with vertical bores 33', see also FIG. 18.

Figure 19:
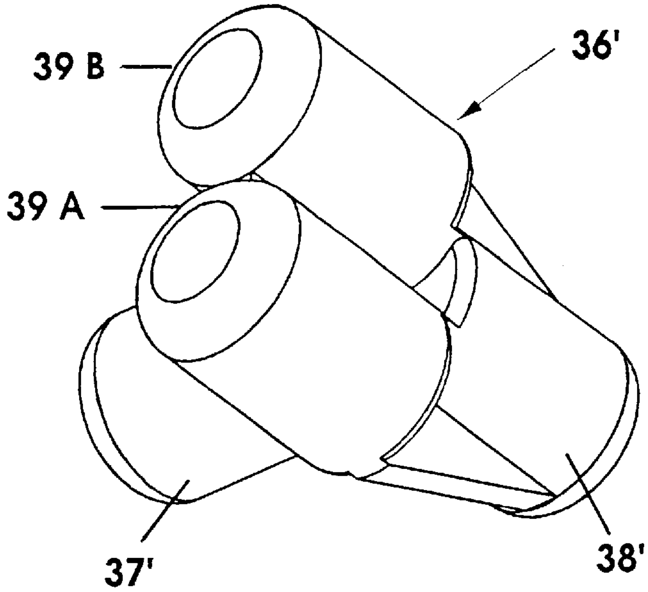
FIG. 19 shows a combined T-Y-piece for connecting the longitudinal and transverse bars in the presentation device according to FIGS. 16 and 17 where the stand structure branches upwards.

FIG. 19 shows a version of the combined T-Y-piece 36', and it is clear that altogether four plug bushes or blind bores 37', 38' and 39A, 39B are provided in one piece made of plastic. In this case, in a modification of the T-piece 36 according to FIG. 13, there are two mutually parallel upper plug bushes 39A, 39B which serve for plugging in the two middle longitudinal bars 3 in each case, in order thereby to achieve the twofold double-H structure of the stand according to FIG. 16.

Figure 20:
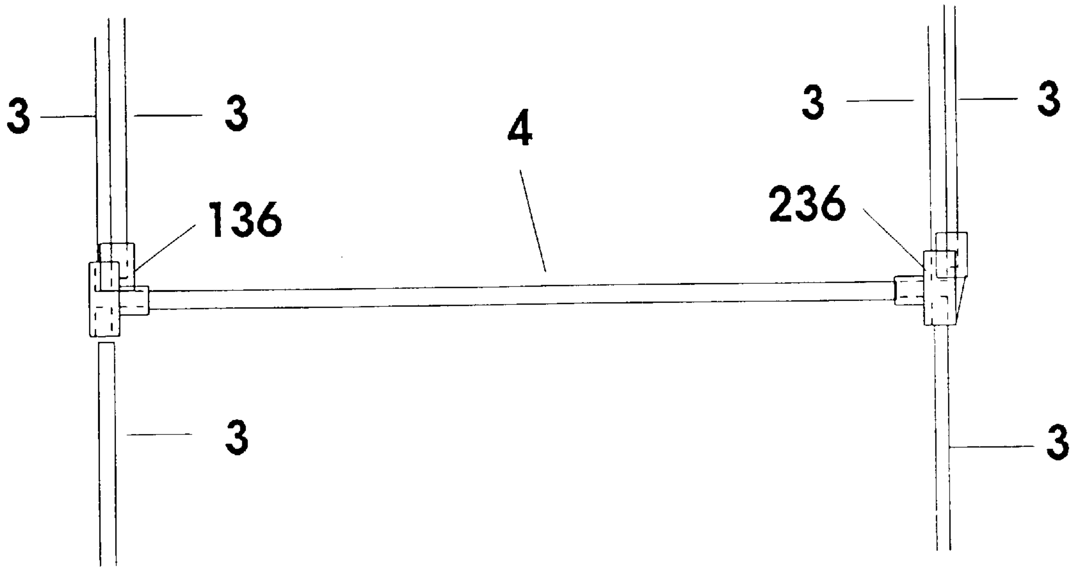
FIG. 20 shows a view of the region with the lower transverse bar in the presentation device according to FIGS. 16 and 17, two slightly modified T-Y-pieces being illustrated.

FIG. 20. illustrates this region of connection of the lower transverse bar 4 and in each case of the two middle longitudinal bars 3 by plugging into the combined T-Y-pieces 36' and attachment to the lower bars 3, FIG. 20 showing two somewhat different coupling pieces 136 and 136', with the upper plug bushes being offset relative to one another.

Figure 21:
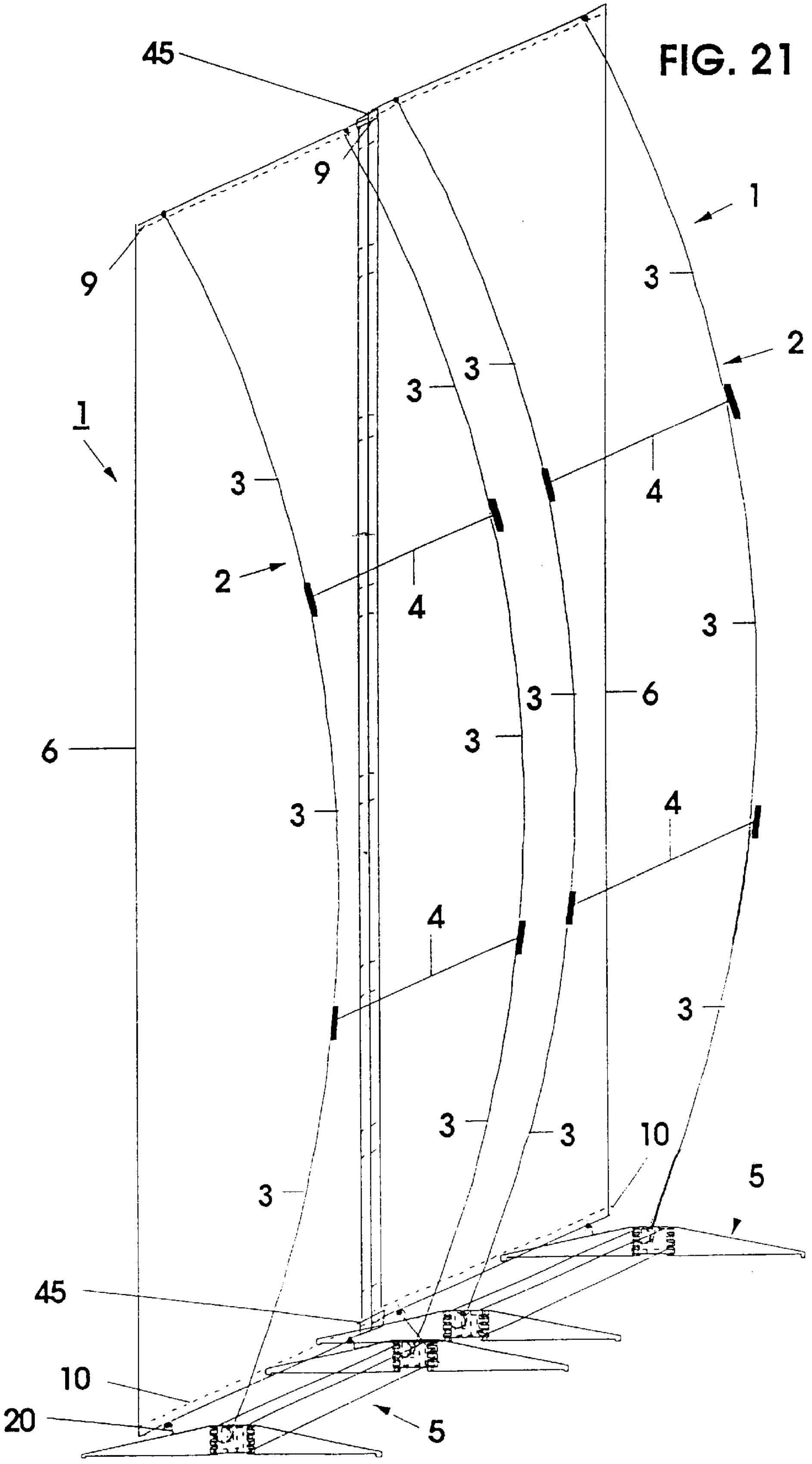
FIG. 21 shows a graphical illustration of two presentation devices which are coupled to one another via connection pieces and which both correspond to the embodiment according to FIGS. 1 and 2.
Figure 23:
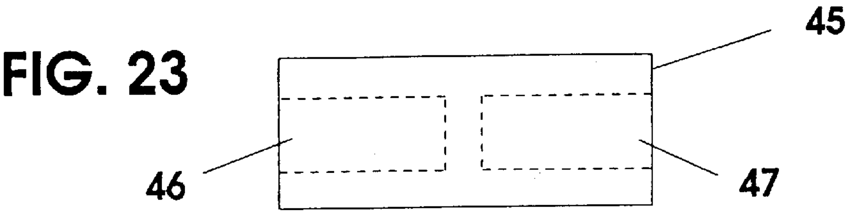
FIG. 23 shows a view of a generally cylindrical connection piece, such as is used in the design according to FIGS. 21 and 22.

FIG. 21 shows two presentation devices 1 according to FIG. 1 erected directly next to one another, the stands 2 of these presentation devices 1 being designed identically and carrying identical presentation carriers 6, so that, in the position of use shown, two structures of identical height are obtained. In order to ensure the uniformity of the overall presentation surface defined by the two presentation carriers 6, even when there are some different bending properties of the bars 3, etc., the uppermost transverse bars 9 and lowermost transverse bars 10 of the two presentation devices 1 are coupled by means of simple, for example cylindrical connection pieces 45 with axially aligned blind bores 46, 47, cf., in addition to FIG. 21, in particular also FIGS. 22 and 23.

Figure 22:
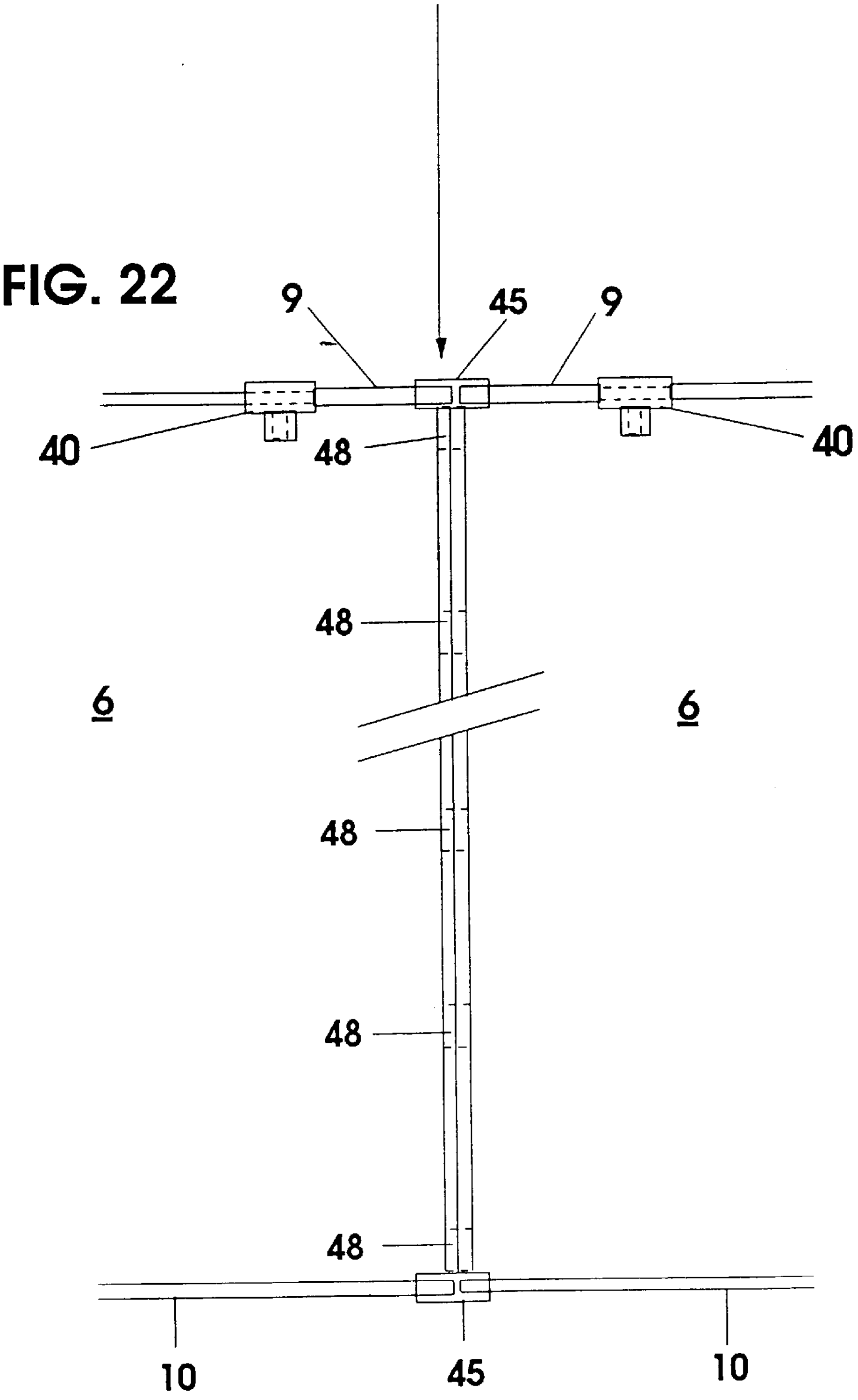
FIG. 22 shows diagrammatically the connection region of the two presentation carriers of the presentation device arrangement according to FIG. 21, the plugging together of the uppermost and lowermost transverse bars by means of the connection pieces and also a connection of the presentation carriers themselves being shown.

FIG. 22 also illustrates diagrammatically, in several places 48, that the presentation carriers 6 can be connected to one another additionally, for example via touch-and-close fastening tapes (Velcro tapes) or via magnetic fastening means, in order thereby additionally to secure the uniform presentation surface. Of course, the connection, instead of being made in individual discrete places 48, may also be made over the entire height of the two presentation carriers 6, for example by means of a touch-and-close fastening.

Furthermore, by means of the connection pieces 45 described, it is possible to couple more than two presentation devices 1, as shown in FIG. 21, depending on the desired overall presentation surface. Also, double stands according to FIGS. 16 and 17, arranged next to one another, may, of course, also be coupled to one another.

What is claimed is:

1. Presentation device (1) with a base (5), with bars (3) for a stand (2) connected to the base (5) via a plug connection, and with a holding means for a presentation carrier (6) for connecting the latter to the base (5) and the stand (2), the base (5) having an elongate foldable foot (14 to 17) which is articulated on an elongate crossmember (11) and which is capable of being pivoted out of a folded-up position of rest parallel to the crossmember (11) into an operating position substantially at right angles to the crossmember (11) and back again, the base comprising an elongate crossmember having at least two feet pivotally connected at one end of the crossmember for movement between an operative extended position with the two feet aligned with each other in a commmon plane with said crossmember and a folded storage position in contact with opposite sides of said crossmember to provide, in the operative extended position, a stable support for the presentation carrier and the stand when connected under tension to the base.

2. Presentation device according to claim 1, characterized in that the four foldable feet (14 to 17) are provided.

3. Presentation device according to claim 1, characterized in that the foldable feet (14 to 17) are lockable in the folded-out position and also in the folded-up position of rest.

4. Presentation device according to claim 3, characterized in that the foldable feet (14 to 17) are vertically adjustable relative to the crossmember (11) along pivot joint pins (26), being freely pivotable in one vertical position relative to the crossmember (11) and being locked in their respective position in another vertical position by coming to bear against a stop (28, 29) of the crossmember (11).

5. Presentation device according to claim 4, characterized in that the joint pins (26) are affixed in joint straps (22, 23) of the crossmember (11) with a press fit.

6. Presentation device according to claim 1, characterized in that each foldable foot (14 to 17) has a plurality of joint straps (21) arranged one above the other and associated joint straps (22, 23) are arranged one above the other on the crossmember (11) , the joint straps (21, 22, 23) of the foldable foot (14 to 17) and of the crossmember engaging one into the other.

7. Presentation device according to claim 1, characterized in that the crossmember (11) is formed by a square profile (30) with pushed-on hollow-profile end parts (12, 13) which carry joint straps (22, 23).

8. Presentation device according to claim 1, characterized in that hooks (20) for suspending a lower transverse bar (10) of the holding means are provided on the top side of two foldable feet (14, 15) provided on one longitudinal side of the cross member (11).

9. Presentation device according to claim 1, characterized in that the stand bars (3) form with one another a plug system.

10. Presentation device according to claim 1, characterized in that plug-in receptacles (33) for the stand bars (3) are provided in the crossmember (11), in hollow-profile end parts (12, 13) of the latter.

11. Presentation device according to claim 10, characterized in that the plug-in receptacles (33) are provided in separate plug inserts (32).

12. Presentation device according to claim 10, characterized in that the plug-in receptacles (33) are formed by oblique bores, the axes of which each extend in a plane (35) perpendicular to the longitudinal axis of the crossmember (11).

13. Presentation device according to claim 10, characterized in that the plug-in receptacles (33') are formed by bores vertical to the longitudinal axis of the crossmember.

14. Presentation device according to claim 12, characterized in that the stand bars (3) run essentially parallel to one another in their position plugged into the bores.

15. Presentation device according to claim 14, characterized in that two transverse struts (4) are provided for connecting the stand bars (3) in a double-H shape.

16. Presentation device according to claim 15, characterized in that the transverse struts (4) are provided at their ends with T-pieces (36) for plugging in stand bars (3).

17. Presentation device according to claim 13, characterized in that combined T-Y-pieces (36'; 136, 136') are attached to the upper ends of the stand bars (3) plugged into the plug-in receptacles (33') and are each provided with two upper blind bores (39A, 39B), to receive a pair of further stand bars (3) for producing two double-H stand structures.

18. Presentation device according to claim 14, characterized in that T-pieces (40) are pushed with their transverse webs onto an upper transverse bar (9) of the holding means, bores (37) for plugging in the stand bars (3) being provided in the legs (43) of said T-pieces.

19. Presentation device according to claim 8, characterized by connection pieces (45) with axially aligned blind bores (46, 47) for connecting the upper and lower transverse bars (9, 10) of two double-H structure stands (2) erected next to one another.

20. Presentation device according to claim 19, characterized in that the presentation carriers (6) on the two double-H structure stands (2) are releasably connected to one another at their mutually adjacent longitudinal edges.

* * * * *